(12) United States Patent
Vladimerou

(10) Patent No.: US 11,314,893 B2
(45) Date of Patent: Apr. 26, 2022

(54) SYSTEMS AND METHODS FOR SECURING PERSONALLY IDENTIFIABLE INFORMATION WITHIN TELEMATICS DATA

(71) Applicant: Toyota Motor Engineering & Manufacturing North America, Inc., Plano, TX (US)

(72) Inventor: Vladimeros Vladimerou, Whitmore Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 314 days.

(21) Appl. No.: 16/552,377

(22) Filed: Aug. 27, 2019

(65) Prior Publication Data
US 2021/0064778 A1    Mar. 4, 2021

(51) Int. Cl.
*G06F 21/62* (2013.01)
*H04L 9/08* (2006.01)
(Continued)

(52) U.S. Cl.
CPC ........ *G06F 21/6245* (2013.01); *H04L 9/0643* (2013.01); *H04L 9/0866* (2013.01); *H04W 4/44* (2018.02)

(58) Field of Classification Search
CPC . G06F 21/6245; G06F 21/602; H04L 9/0866; H04L 9/0643; H04L 63/0428;
(Continued)

(56) References Cited

U.S. PATENT DOCUMENTS 10,073,743 B2    9/2018 Topham
2004/0267410 A1    12/2004 Duri et al.
(Continued)

FOREIGN PATENT DOCUMENTS

WO    2015058860 A1    4/2015

OTHER PUBLICATIONS

"Smarter Security for Smart Cars," AutoCrypt, found at https://www.pentasecurity.com/product/autocrypt/ (Retrieved on Aug. 27, 2019).

(Continued)

*Primary Examiner* — Mohammed Waliullah
(74) *Attorney, Agent, or Firm* — Christopher G. Darrow; Darrow Mustafa PC

(57) ABSTRACT

Systems, methods, and other embodiments described herein relate to securing personally identifiable information associated with riding in a vehicle. In one embodiment, a method includes, in response to receiving, in a mobile device from the vehicle, telematics data about a current trip of the vehicle, securing the telematics data according to at least a mobile cryptographic key associated with the mobile device to provide the telematics data as secured data that is obfuscated. The method includes generating, by the mobile device, a secure packet including at least the secured data and a signature from the vehicle associated with the secured data. The method includes communicating, by the mobile device, the secure packet to a remote computing device to cause the remote computing device to securely store the secured data without identifying a user associated with the mobile device.

17 Claims, 7 Drawing Sheets

(51) Int. Cl.
*H04L 9/06* (2006.01)
*H04W 4/44* (2018.01)

(58) Field of Classification Search
CPC ............... H04L 9/0894; H04L 2209/42; H04L 2209/84; H04L 9/3247; H04W 4/44
See application file for complete search history.

(56) References Cited

U.S. PATENT DOCUMENTS

| | | |
|---|---|---|
| 2012/0322458 A1 | 12/2012 | Shklarski et al. |
| 2015/0045983 A1 | 2/2015 | Fraser et al. |
| 2015/0193638 A1 | 7/2015 | Cook |
| 2016/0191704 A1 | 6/2016 | Macinnes et al. |
| 2018/0026949 A1* | 1/2018 | Kimn ............... H04W 12/0433 713/156 |
| 2018/0076958 A1 | 3/2018 | Narimoto et al. |
| 2018/0091596 A1* | 3/2018 | Alvarez ................ H04L 67/12 |
| 2018/0218548 A1 | 8/2018 | Smith et al. |
| 2018/0234843 A1 | 8/2018 | Smyth et al. |
| 2018/0302228 A1 | 10/2018 | Hergesheimer |
| 2019/0005588 A1 | 1/2019 | Carver et al. |

OTHER PUBLICATIONS

Allen, "Exploring the Lifecycle of a Cryptographic Key" Cryptomathic.com, Mar. 19, 2018.

Oyler et al., Security in automotive telematics: a survey of threats and risk mitigation strategies to counter the existing and emerging attack vectors, Security Comm. Networks 2016; 9:4330-4340, Sep. 7, 2016.

* cited by examiner

SYSTEMS AND METHODS FOR SECURING PERSONALLY IDENTIFIABLE INFORMATION WITHIN TELEMATICS DATA

TECHNICAL FIELD

The subject matter described herein relates, in general, to security mechanisms for protecting telematics data, and, more particularly, to securing personally identifiable information within telematics data.

BACKGROUND

Traditionally, vehicle security has involved a vehicle owner using a physical key to lock a door and/or start a vehicle manually. As technology advances, this traditional vehicle security has morphed into more complex systems that involve additional features but also encounter additional/different risks. For example, many vehicles now include the ability to collect data about the operation of the vehicle, and communicate the collected data (also referred to as telematics data) to various remote entities. The ability to collect the telematics data and provide the telematics data to a manufacturer or other entity enables additional features for the vehicle owner and for the original manufacturer. For example, communicating the data may provide for tracking vehicle maintenance, automating reminders, improving security, and so on. In the context of the manufacturer, the telematics data provides insights about vehicle usage, potential maintenance problems, marketing data, and so on.

However, the telematics data also includes personally identifiable information (PII), which is data that links the vehicle with the identity of a particular person. The PII data can include information such as GPS location data from start/end points of a route, driving habits, and so on. Thus, with the advent of personal data privacy laws such as the California Online Privacy Protection Act (CalOPPA), the European Union General Data Protection Regulation (GDPR), and others, telematics data that is unsecured can be problematic. That is, the communication of the telematics data to third-parties, such as manufacturers, represents a significant difficulty since telematics data generally includes PII data that may be subject to various statutes and that should be secured. However, mechanisms for providing control of the data to users and for properly securing the data are generally unavailable or ill-suited for integration with existing vehicles.

SUMMARY

Example systems and methods disclosed herein relate to securing personally identifiable information in telematics data. As noted, vehicles may collect telematics data about various operating aspects and communicate the telematics data for use by various entities. However, because the telematics data can include PII data, which may be subject to various privacy laws, the plain communication and storage of this information is problematic. Therefore, the present disclosure describes various approaches to securing the telematics data in order to further protect the PII data. That is, in one approach, a vehicle and a mobile device initially register with a cloud-based computing system in order to, for example, establish cryptographic keys. The cloud-based system may store the keys for subsequent access to the data and filtering of PII data so that the telematics data can be otherwise accessed without revealing the PII.

In either case, the mobile device and the vehicle operate in concert to ensure that the telematics data is secure. For example, as the vehicle generates the telematics data, the vehicle can communicate the telematics data to the mobile device associated with a person that is presently riding in the vehicle. The device may then use the cryptographic key to encrypt the telematics data, thereby securing the telematics data against intrusion. The vehicle may also contribute a cryptographic signature of the data to identify the vehicle in relation to the data. The mobile device can then communicate the secured telematics to the cloud-based computing system for secure storage. In a further aspect, the cloud-based system may process the secured data to remove any identifying aspects (e.g., digital signatures) and simply associate the data with the vehicle and/or the mobile device using a numeric identifier such as the hash. In this way, the vehicle, the mobile device, and the cloud-based system function together to protect the PII data within the telematics data from improper use.

Subsequently, the mobile device can retrieve the telematics data from the cloud-based computing system using the hash of the data. In general, the mobile device can retrieve the telematics without being in the presence of the vehicle. That is, in the circumstance where the vehicle is a commercial vehicle providing an e-haling ride, a rideshare, etc., the mobile device can still retrieve the telematics for the prior trip. Thus, the telematics data, and, in particular, the PII data are associated with the particular mobile device/user combination so that the privacy of the user is protected even when riding in a vehicle that the user does not own.

In one embodiment, a privacy system for securing personally identifiable information associated with riding in a vehicle is disclosed. The system includes one or more processors and a memory communicably coupled to the one or more processors. The memory stores a crypto module including instructions that when executed by the one or more processors cause the one or more processors to, in response to receiving telematics data about a current trip of the vehicle, secure the telematics data according to at least a mobile cryptographic key associated with the mobile device to provide the telematics data as secured data that is obfuscated. The crypto module includes instructions to generate, by the mobile device, a secure packet including at least the secured data and a signature from the vehicle associated with the secured data. The memory stores a communication module including instructions that when executed by the one or more processors cause the one or more processors to communicate the secure packet to a remote computing device from the mobile device to cause the remote computing device to securely store the secured data without identifying a user associated with the mobile device.

In one embodiment, a non-transitory computer-readable medium for securing personally identifiable information associated with riding in a vehicle and including instructions that when executed by one or more processors cause the one or more processors to perform one or more functions is disclosed. The instructions include instructions to, in response to receiving telematics data about a current trip of the vehicle, secure the telematics data according to at least a mobile cryptographic key associated with the mobile device to provide the telematics data as secured data that is obfuscated. The instructions include instructions to generate, by the mobile device, a secure packet including at least the secured data and a signature from the vehicle associated with the secured data. The instructions include instructions to communicate the secure packet to a remote computing device from the mobile device to cause the remote computing device to securely store the secured data without identifying a user associated with the mobile device.

In one embodiment, a method for securing personally identifiable information associated with riding in a vehicle is disclosed. In one embodiment, the method includes, in response to receiving, in a mobile device from the vehicle, telematics data about a current trip of the vehicle, securing the telematics data according to at least a mobile cryptographic key associated with the mobile device to provide the telematics data as secured data that is obfuscated. The method includes generating, by the mobile device, a secure packet including at least the secured data and a signature from the vehicle associated with the secured data. The method includes communicating, by the mobile device, the secure packet to a remote computing device to cause the remote computing device to securely store the secured data without identifying a user associated with the mobile device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
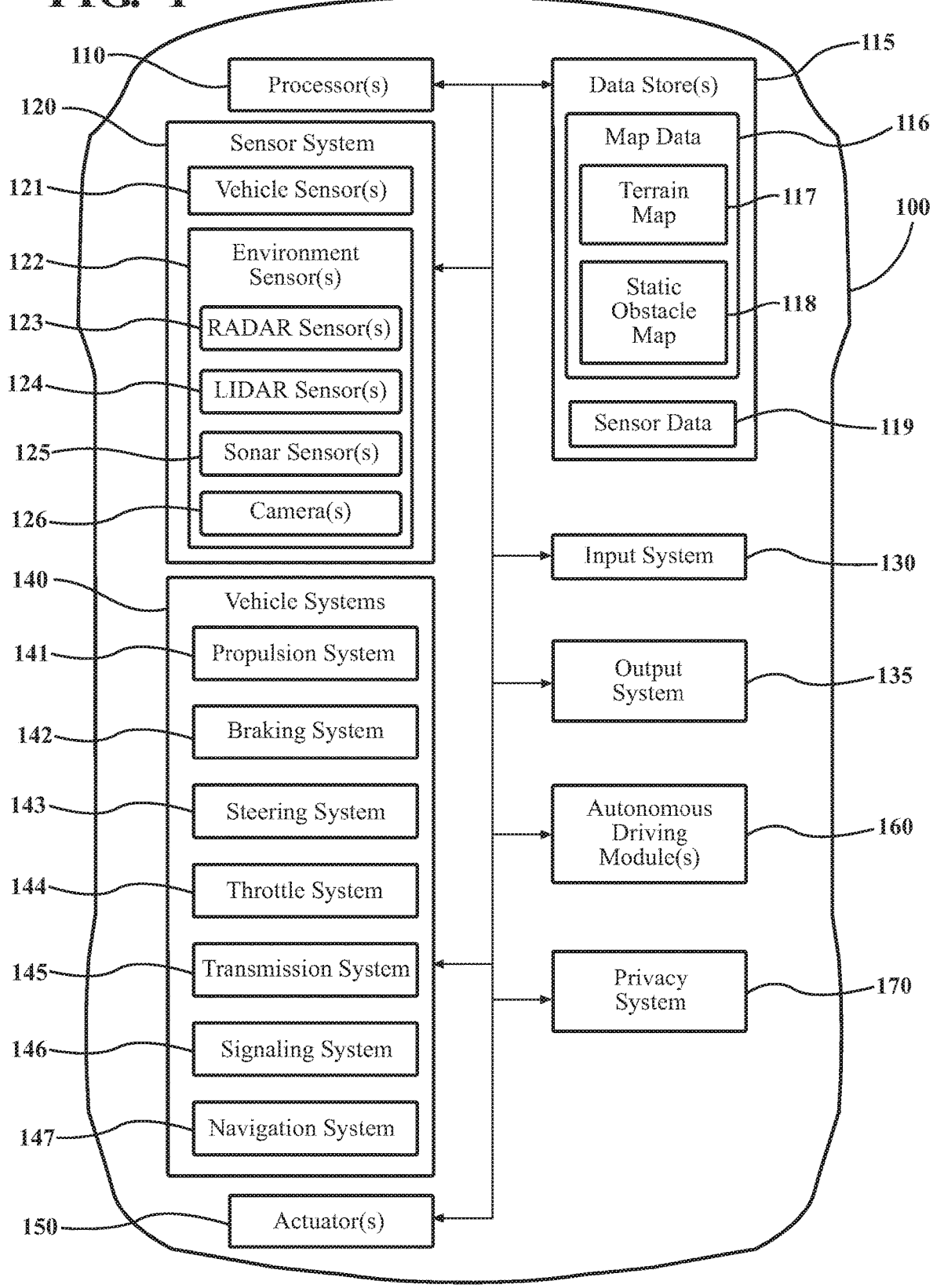
FIG. 1 illustrates one embodiment of a vehicle within which systems and methods disclosed herein may be implemented.

Systems, methods, and other embodiments associated with securing personally identifiable information (PII) within telematics data of a vehicle are disclosed. As previously described, vehicles may collect telematics data about various operating aspects of the vehicle and communicate the telematics data for use by various entities. For example, the telematics data may include explicit information about a rider such as start and end points of a route (e.g., location of a home), driving behaviors, etc., and implicit information such as infotainment selections, and so on. Because the PII data may be subject to various privacy laws, the plain communication and storage of this information may involve obligations to secure the privacy of the user.

Therefore, the present disclosure describes various approaches to securing the telematics data in order to further protect the PII data while recognizing the transient nature of passengers between multiple vehicles. Accordingly, to provide a robust solution to remedy this difficulty, and in recognition of the fact that a user may ride in many different vehicles including owned vehicles, vehicles of acquaintances, rideshare/e-hailing vehicles, etc., a mobile device functions to interact with the vehicle and secure the telematics data on behalf of the user. For example, the mobile device and the vehicle initially register with a cloud-based computing system in order to, for example, establish cryptographic keys (e.g., public/private key pairs) for securing the data and electronically signing the data. The cloud-based system, in one or more approaches, is a distributed network-based resource that may store the keys, or at least the public key of the key pairs, for subsequent access to the data and/or filtering of PII data so that the telematics data can be otherwise accessed without revealing the PII data.

In either case, the mobile device and the vehicle operate in concert to ensure that the telematics data is secure. In one aspect, as the vehicle generates the data, the vehicle can communicate the data to the mobile device associated with a person that is presently riding in the vehicle. Thus, the vehicle performs a hand-off of the data to the mobile device instead of, for example, attempting to separately secure the data for each different rider/user that may ride in the vehicle. The mobile device may then use the mobile cryptographic key to encrypt the telematics data thereby securing/obfuscating the telematics data.

In various implementations, the mobile device can further append identifying information to the secured telematics data to identify a source. For example, the mobile device can use the mobile cryptographic key (e.g., a private key of the public/private key pair) to generate a digital signature by hashing the secured data and encrypting the hash with the key. Additionally, the mobile device may further provide the hash to the vehicle for the vehicle to generate a digital signature that the mobile device may also append to the secured data. Thus, while the signatures generally identify the participating entities, the signatures do not reveal actual identities nor the underlying information, but generally serve to authenticate and link the secured data to the originating vehicle/device combination.

The mobile device communicates the secured telematics data as a secure packet that includes the signatures to the cloud-based computing system for storage. The cloud-based system, in one or more approaches, processes the secured data to remove the identifying signatures and simply associate the data with the vehicle and/or the mobile device using an identifier such as the hash or another alpha-numeric identifier generated by the cloud-based system. The cloud-based system may further verify the source vehicle as a certified/previously registered source via a registration table or other lookup mechanism that the cloud-based system maintains. Additionally, in yet further aspects, the cloud-based system can provide additional functionality such as filtering or otherwise obscuring the PII data from the telematics data in order to harvest information for various entities. In this way, the vehicle, the mobile device, and the cloud-based system function together to protect the PII data within the telematics data from improper use.

Subsequently, the mobile device can retrieve the telematics data from the cloud-based computing system using, for example, the hash of the data. In general, the mobile device can retrieve the telematics without being in the presence of the original vehicle. That is, in the circumstance where the vehicle is a commercial vehicle providing an e-haling ride, a rideshare, etc., the mobile device can still retrieve the telematics for the prior trip even though the original vehicle may be unavailable. In various approaches, the cloud-based system may restrict access to the telematics data by the mobile device to circumstances where another registered vehicle other than the original vehicle is present to provide an additional authenticating source for the mobile device/ user. That is, the mobile device may access the telematics data without the original vehicle but in cooperation with another registered vehicle. Thus, the telematics data, and, in particular, the PII data are associated with the particular mobile user so that the disclosed systems and methods can function to protect the privacy of the user and generally provide control of the PII data to the user.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles, but embodiments are discussed in relation to automobiles as one example of an environment in which a transportation device may generate telematics data that include PII data that is to be secured. In some implementations, the vehicle 100 may be any form of transport that, for example, generates PII data, and thus benefits from the functionality discussed herein.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-based computing services).

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a privacy system 170 that functions to improve the security of personally identifiable information (PII) data. As noted previously, because telematics data may explicitly and/or implicitly include such sensitive information, it is generally imperative to secure the PII data to prevent intrusions into the privacy of the user/rider, and, in some instances, to ensure compliance with various statutes. Thus, the privacy system 170 uses a particular communication protocol between the vehicle 100 and a mobile device to facilitate securing the information. Moreover, while depicted as a component within the vehicle 100, in one or more embodiments, the privacy system 170 is integrated with a mobile device, the vehicle 100, and a cloud-based computing system to provide the presently disclosed functionality. Thus, the privacy system 170 may be distributed among various participating devices, as discussed in greater detail subsequently. The noted functions and methods will become more apparent with a further discussion of the figures.

Figure 2:
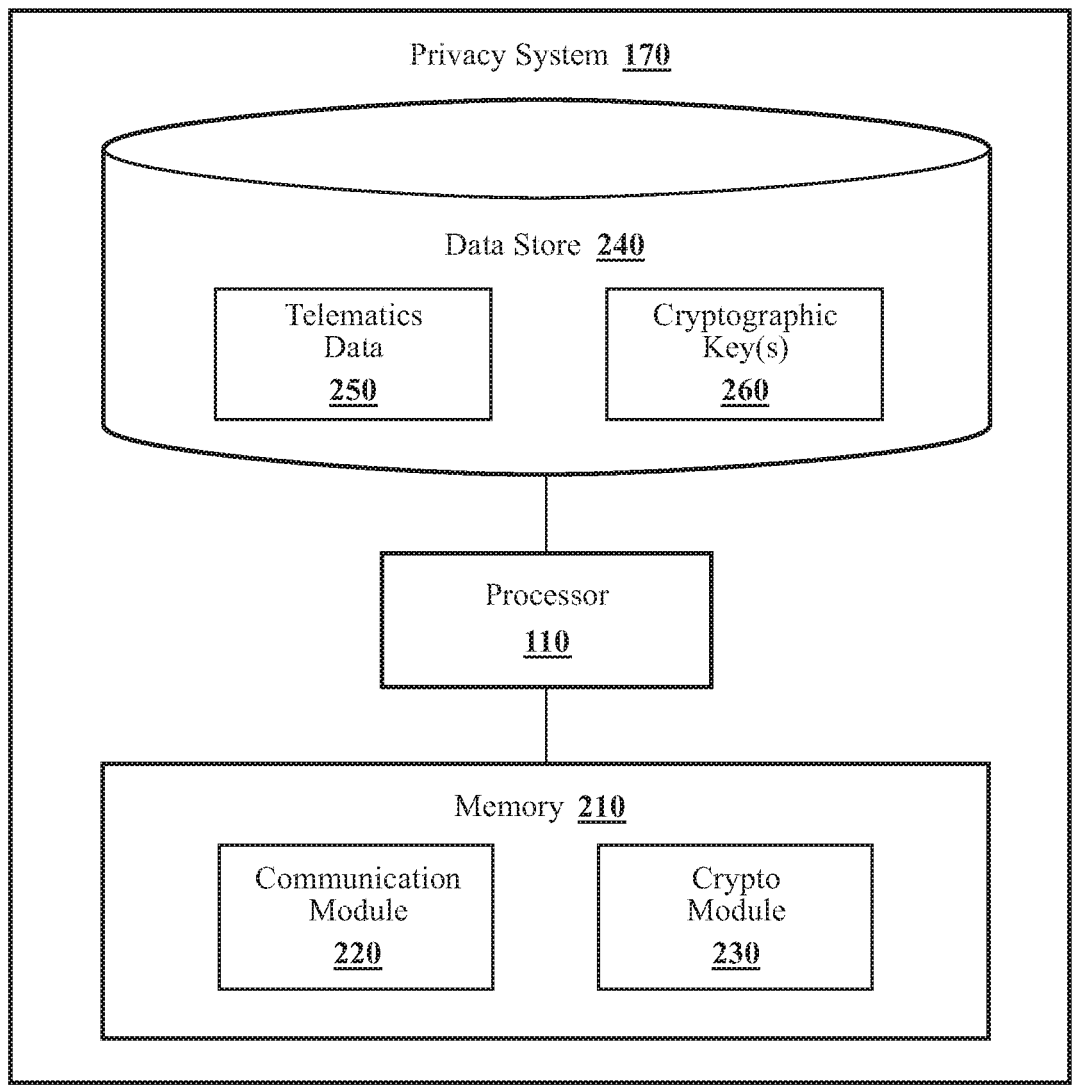
FIG. 2 illustrates one embodiment of a privacy system that is associated with improving the security of personally identifiable information associated with riding in a vehicle.

With reference to FIG. 2, one embodiment of the privacy system 170 is further illustrated. As shown, the privacy system 170 includes a processor 110. Accordingly, the processor 110 may be a part of the privacy system 170 or the privacy system 170 may access the processor 110 through a data bus or another communication path. In one or more embodiments, the processor 110 is an application-specific integrated circuit that is configured to implement functions associated with a communication module 220 and a crypto module 230. In general, the processor 110 is an electronic processor such as a microprocessor that is capable of performing various functions as described herein when implemented in combination with the noted instructions and/or modules. While the processor 110 is illustrated as being part of the vehicle 100, in various implementations, the privacy system 170 may leverage a processor of the vehicle 100, a processor of a mobile device, and/or a processor of a cloud-based computing system to achieve the noted functions.

In one embodiment, the privacy system 170 includes a memory 210 that stores the communication module 220 and the crypto module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein. In one or more embodiments, the modules 220 and 230 are embedded in an on-chip memory of the processor 110.

Furthermore, in one embodiment, the privacy system 170 includes a data store 240. The data store 240 is, in one embodiment, an electronic data structure such as a database that is stored in the memory 210 or separately in another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes telematics data 250, and one or more cryptographic keys 260 along with, for example, other information that is used by the modules 220 and 230.

As an additional explanation of the telematics data 250, in one or more embodiments, the telematics data 250, as used herein, refers to any data that the vehicle 100 collects and wirelessly communicates. The telematics data 250 itself includes, in one or more embodiments, external sensor data (e.g., images, point cloud data, etc.), internal sensor data (e.g., IMU data, velocity, engine information, etc.), infotainment information, navigation system information, GPS location data, and so on. The personally identifiable information (PII) (also referred to herein as PII data) includes any aspect of the telematics data that may individually identify the user either explicitly or implicitly. That is, for example, waypoints in a route associated with a home or business of the user are PII data. Further examples of PII data include telephone contacts and calls via an infotainment system of the vehicle 100. In further aspects, implicit PII data may include patterns of driver control inputs that a system may analyze and statistically attribute to the driver/user through learned driving characteristics of the user. It should be appreciated that the PII data may take different forms depending on the particular set of telematics data that a vehicle collects. In general, the examples of the telematics data 250 are not an exhaustive listing but are provided to illustrate examples of what the data may include. In any case, the vehicle 100 generally communicates the telematics data 250 to a remote entity such as an original equipment manufacturer (OEM) or other entity for purposes of analysis or reporting that may form the basis of additional services provided to the vehicle 100 and/or riders therein.

Figure 3:
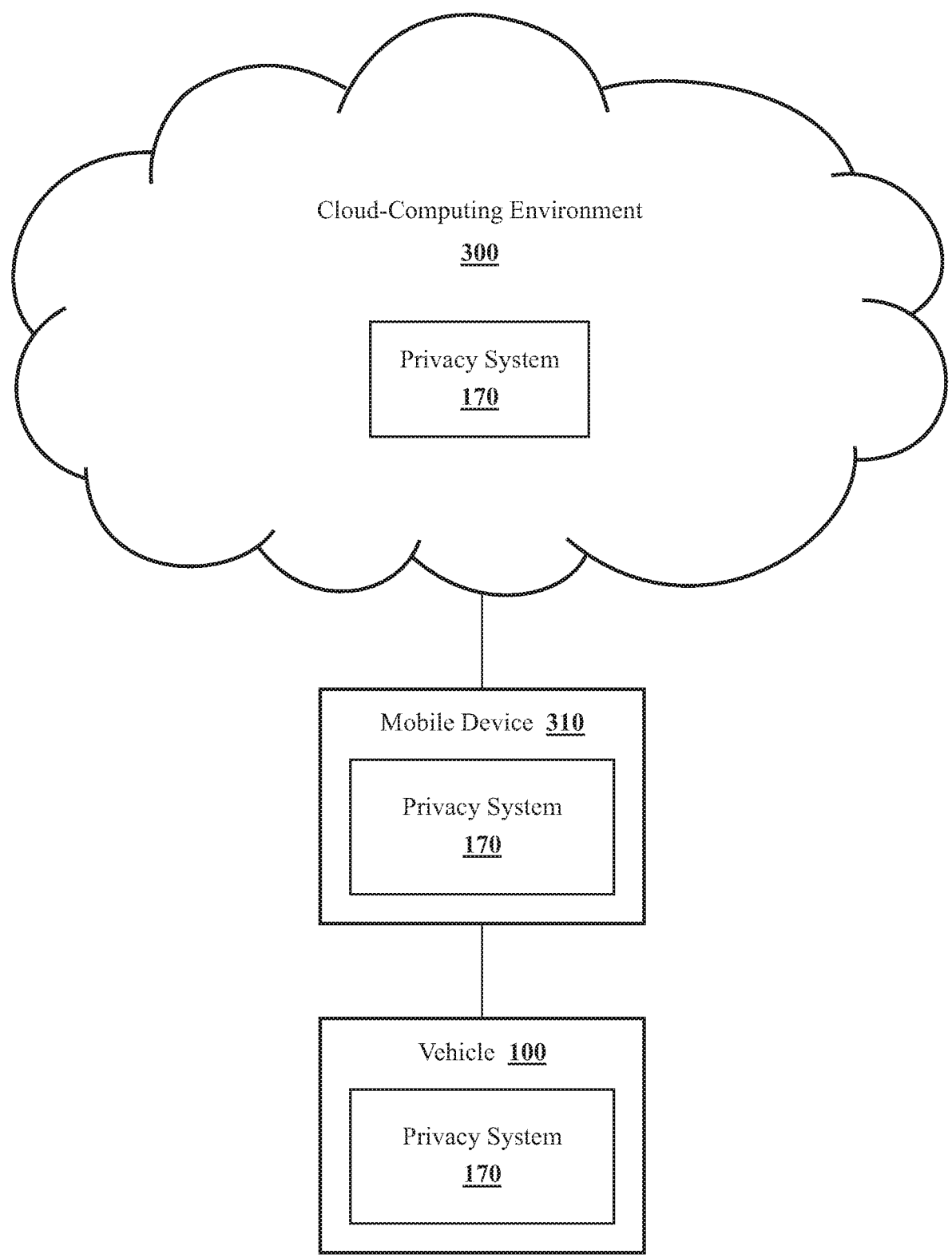
FIG. 3 is a diagram illustrating one configuration of a cloud-based computing environment and relationships between devices.

Moreover, a general structure of the present arrangement of devices is illustrated in FIG. 3. As shown, FIG. 3 includes a cloud-computing environment 300, a mobile device 310, and the vehicle 100. In general, the cloud-computing environment 300 is comprised of a network of remote computing devices that may be geographically distributed and that function together to provide various functionality such as the secure storage of the telematics data 250. The mobile device 310 is, in one or more embodiments, a device associated with a user/rider in the vehicle 100 that is capable of wirelessly communicating and encrypting data. In general, the mobile device 310 may be a smartphone, a tablet computer, a laptop computer, or another suitable device. In any case, the vehicle 100 and the mobile device 310 generally communicate wirelessly to transfer the telematics data 250 and other information (e.g., hashes, signatures, administrative information, etc.) therebetween. The mobile device 310, in one approach, functions as a gateway/relay for the vehicle 100 to secure and provide the telematics data 250 to the cloud-computing environment 300. That is, the vehicle 100 provides the telematics data 250 via the mobile device 310, which performs various processing on the telematics data 250, to the cloud-computing environment for secure storage.

While the connections between the various devices are generally described as being "wireless," the particular form of the connections may vary. For example, a connection between the mobile device 310 and the vehicle 100 may be a short-range wireless communication protocol such as Bluetooth. In yet further embodiments, the connection between the vehicle 100 and the mobile device 310 may be a WiFi-based connection or another suitable wireless protocol connection. Additionally, in one or more instances, the mobile device 310 may connect directly with the vehicle 100 using a wired connection such as a universal serial bus (USB) connection. However, the connection between the mobile device 310 and the cloud-computing environment 300 is generally a cellular-based connection such as 5G-NR connection, a 4G LTE connection, a 3G connection, a WiMAX connection, or another suitable connection for establishing a wireless communication link for the transfer of the telematics data 250.

FIG. 3 further illustrates the separate devices/environments as implementing multiple instances of the privacy system 170. It should be appreciated that the separate instances of the privacy system 170 while shown as analogous instances may be implemented in various configurations. For example, in one or more embodiments, the privacy system 170 of the mobile device 310 serves as a primary controller for processing the telematics data 250 while the cloud-computing environment 300 and the vehicle 100 perform other functions that may be, for example, less complex in comparison to the mobile device 310. Thus, the vehicle 100 and the cloud-computing environment 300 may implement separate instances of the communication module 220 while the mobile device 310 implements both the communication module 220 and the crypto module 230. In further aspects, the cloud-computing environment 300 and the vehicle 100 may implement "lite" versions of the crypto module 230 to provide various ancillary functions such as generating a digital signature. In any case, the mobile device 310 implements the privacy system 170 in a primary form to facilitate the functionality discussed herein, while the vehicle 100 and the cloud-computing environment 300 generally implement separate versions of the system 170 that function in support roles. Moreover, as used herein, reference to the privacy system 170 and components thereof generally refers to components embodied within the mobile device 310 or a similar device unless specified otherwise in relation to the vehicle 100 or the cloud-computing environment 300.

Continuing with FIG. 2, in one embodiment, the communication module 220 generally includes instructions that function to control the processor 110 to communicate with the vehicle 100 and the cloud-based computing device (e.g., cloud-computing environment 300). For example, in one approach, the communication module 220, from the perspective of the mobile device 310, receives one or more communications from the vehicle 100. The communications may take different forms depending on the particular implementation; however, it should be appreciated that the vehicle 100 generally communicates the telematics data 250 directly to the mobile device 310 and to the communications module 220.

As an initial aspect of providing the telematics data 250 between the various devices, the mobile device 310 and the vehicle 100, in one or more embodiments, initially register with the cloud-computing environment 300. In one approach, the cloud-computing environment 300 is provided as a software-as-a-service (SaaS) or other distributed resource that provides for registering devices to ensure an authenticity of the devices and provide a trusted source for distribution and tracking of cryptographic secrets (e.g., cryptographic keys). In one approach, the cloud-computing environment 300 may function in cooperation with a mobile application that installs on the mobile device 310 and/or the vehicle 100 and provides support for a protocol that defines the form and other aspects of communications provided between the various entities.

In any case, as noted, the vehicle 100 and the mobile device 310 initially establish a relationship with the cloud-computing environment 300 by registering or otherwise requesting cryptographic keys 260 from the privacy system 170 of the cloud-based computing environment 300. For example, in one approach, the vehicle 100, as part of a manufacturing process or subsequently as an installed update, downloads a mobile application that executes on a head unit, infotainment system, or other computing device of the vehicle 100 to implement the noted functionality of the privacy system 170. Similarly, the mobile device 310, via control inputs provided by a user, downloads a mobile application that executes therein to provide the noted functionality of the privacy system 170.

As part of registering, the mobile device 310 and the vehicle 100 communicate directly with the cloud-computing environment 300 to establish one or more cryptographic secrets. The secrets may take the form of passwords, pins, digital certificates including a public/private key pair, symmetric cryptographic key(s), and so on. In further aspects, the vehicle 100 and/or the mobile device 310 may use existing digital certificates (including asymmetric key pairs), when available, as part of registering instead of the cloud-computing environment 300 issuing a new certificate. In either case, the privacy system 170 as established in the mobile device 310 still generally creates a separate mobile cryptographic key or keys 260 that are, for example, an asymmetric cryptographic key pair. In one approach, the communication module 220 in the mobile device 310 acquires user input of a password or another secret (e.g., pseudorandom number provided as a seed value), and uses the password to form the mobile cryptographic key 260 (also referred to as a mobile key 260 herein) through, for example, hashing the password with a random prime number, a pseudorandom number, a key of a digital certificate of the device 310, or another suitable data value. In one approach, the crypto module 230 uses the password or other seed value as an input to a deterministic pseudorandom number generator to produce a pseudorandom number. This provides for, in one aspect, expanding the password into a sufficiently long enough string (e.g., into 128 bits, 256 bits, 512 bits, etc.) as may be used as an input to a key derivation function. The crypto module 230 may then use the pseudorandom number as an input to the key derivation function (e.g., Password-Based Key Derivation Function 2 (PBKDF2)) to generate an asymmetric key pair including a private key (i.e., the mobile key 260) and a public key. In general, the key pair may be regenerated using the original password/seed in the same manner as originally derived. The mobile device 310 may then communicate the key pair or just the public key to the cloud-computing environment 300 as part of registering and/or for archiving.

Once the vehicle 100 and the mobile device 310 establish a relationship with the cloud-computing environment 300, the vehicle 100 and the mobile device 310 can establish a connection and begin securing the telematics data 250. For example, in one or more arrangements, the communication module 220 of the mobile device 310 initiates a connection at the beginning of a new ride. That is, the communication module 220, in one or more approaches, initiates a connection with the vehicle 100 according to an inducing event. The inducing event may include the communication module 220 of the device 310 sensing a presence of the vehicle 100 via a wireless beacon, via the establishment of a physical connection between the device 310 and the vehicle 100, via an electronic interrupt/indicator from another mobile application (e.g., an e-haling app or other app associated with the transportation of the user), via a direct communication from the vehicle 100 in recognition of the presence of the mobile device 310, or another suitable inducing event such as the direct activation of the connection by control inputs from the user.

In response to the inducing event, the mobile device 310 via the communication module 220, in one or more embodiments, establishes a connection with the vehicle 100. In one approach, as part of establishing the connection, the mobile device 310 may establish a session key with the vehicle 100 in order to secure direct communications with the vehicle 100. In one or more approaches, the communication module 220 derives the session key (i.e., a symmetric key) using a shared secret via, for example, a Diffie-Helman exchange or another secure handshake. In either case, the communication module 220 may secure direct communications between the vehicle 100 and the mobile device 310 using the session key or may otherwise secure the connection by, for example, using short-range communications and/or modulating a signal strength of a wireless signal.

Thereafter, the vehicle 100 may notify the communication module 220 of the mobile device 310 when, for example, telematics data 250 has been generated and is ready for communication. This initial notification may serve to ensure the mobile device 310 is available or otherwise awake and ready to process the telematics data 250. In further configurations, the communication module 220 of the vehicle 100 may simply provide the telematics data in a communication without an initial notification. In either case, the communication module 220 of the mobile device 310 initially receives the telematics data 250. It should be appreciated that the vehicle 100 is, in one or more arrangements, continuously generating the telematics data 250. Thus, the communication module 220 of the vehicle 100 may, in one approach, logically aggregate and divide the telematics data 250 into portions having, for example, a defined size. Alternatively, the communication module 220 may communicate the telematics data 250 in portions at defined intervals to the mobile device 310.

In either case, the communication module 220 within the mobile device 310 receives the telematics data 250 from the vehicle 100 about a current trip or segment of a trip. As will be discussed in further detail subsequently, the communication module 220 may provide and receive various intermediate communications to/from the vehicle 100 such as providing a hash to the vehicle 100 for digital signing by the vehicle, and so on. Once the crypto module 230 secures the telematics data 250 into a secure packet, the communication module 220, in one embodiment, then electronically communicates the secure packet to the cloud-computing environment 300 for secure storage.

Continuing with further elements of FIG. 2, the crypto module 230 generally includes instructions that function to secure the telematics data 250 from malicious intervention. Accordingly, in one or more embodiments, the crypto module 230 secures the telematics data 250 by encrypting the telematics data 250 using the mobile key 260 to secure and otherwise obfuscate (i.e., conceal) the telematics data 250 including any potential PII data that may be included therein. Thus, instead of analyzing the telematics data 250 and attempting to identify and filter the PII data therefrom, the crypto module 230 simply encrypts the data to provide secure data as an output. This process of encrypting the telematics data to produce the secure data effectively encapsulates the telematics data 250 and thereby obfuscates the telematics data from view without the public key pair of the mobile key 260 to decrypt the telematics data.

Figure 4:
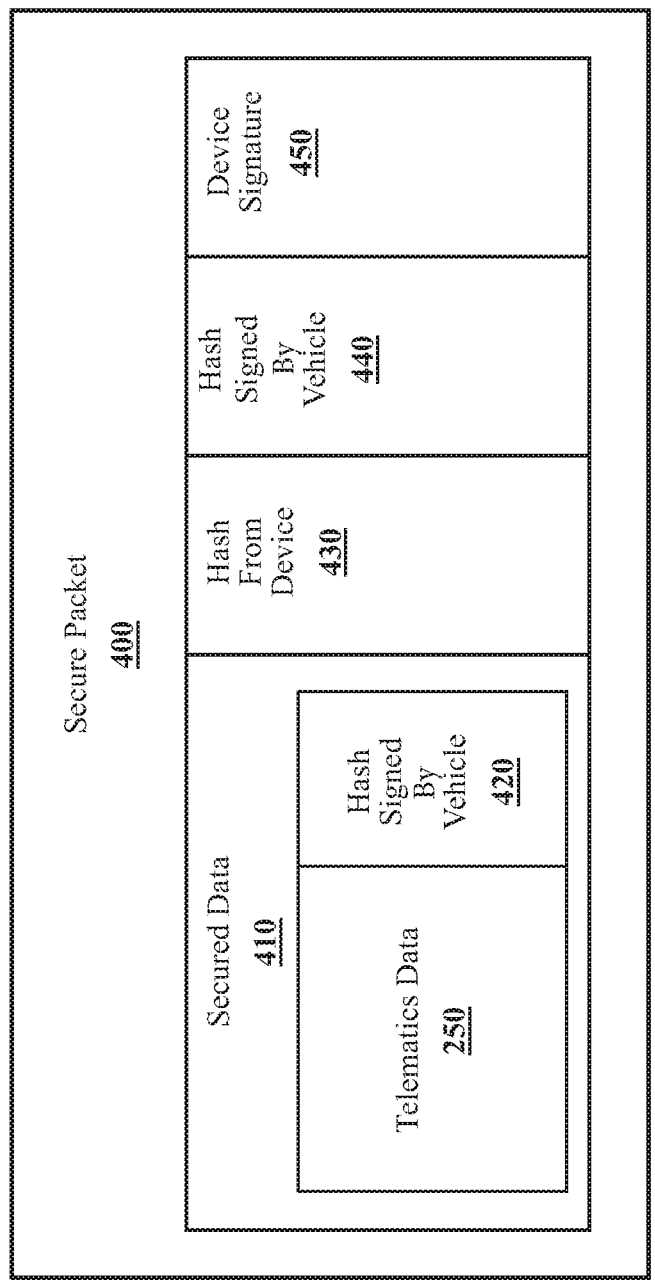
FIG. 4 illustrates one example of a secure packet for communicating the telematics data.

The crypto module 230, in one approach, may then use the secured data to form a secure packet that the communication module 220 communicates to the cloud-computing environment 300 for storage. For example, with reference to FIG. 4, one embodiment of a secure packet 400 is illustrated. As shown in FIG. 4, the secure packet 400 includes multiple different elements. It should be appreciated that the illustrated version of the secure packet 400 is one way in which the privacy system 170 of the mobile device 310 may generate the secure packet. In general, the secure packet 400 includes at least the secured data 410 that includes an encrypted form of the telematics data 250 along with, in one embodiment, a signed hash 420 of the telematics data 250. The vehicle 100 generates and provides the signed hash 420 with the telematics data 250 when communicating the telematics data 250 to the mobile device 310 as, for example, a mechanism of authenticating the vehicle 100 as the source of the telematics data 250.

The privacy system 170 of the vehicle 100 generates the signed hash 420 by, for example, applying a hashing function to the telematics data 250 to generate a hash, which the vehicle 100 then signs using, in one approach, a private key of an asymmetric cryptographic key pair (e.g., as generated when registering with the cloud-based system 300). Thus, the crypto module 230 of the mobile device 310 can encrypt the telematics data 250 and the signed hash 420 together to form the secured data 410. Of course, in alternative arrangements, the crypto module 230 may simply use the signed hash 420 to authenticate the telematics data 250 and otherwise discards the signed hash 420 without including the signed hash 420 as part of the secured data 410.

The crypto module 230 of the mobile device 310 further generates, in one embodiment, the hash 430 of the secured data 410 (e.g., encrypted telematics data 250) according to a hash function (e.g., SHA-2, SHA-3, etc.), which may be a keyed-function that is seeded with a cryptographic key (e.g., key 260 or another key) or may be seeded otherwise. In one aspect, the communication module 220 communicates the hash 430 back to the vehicle 100 as, for example, confirmation of receipt of the telematics data 250. The vehicle 100 then, in one approach, signs the hash 430 to generate the signed hash 440 and communicates the signed hash 440 back to the mobile device 310, which the crypto module 230 of the mobile device 310 may then append to the secured data 410 when generating the secure packet 400.

Lastly, the crypto module 230, in one or more configurations, generates the device signature 450 over all of the elements of the secure packet 400, which may include all of the illustrated elements or, alternatively, in a simplest form may include the signed hash 440 and the secured data 410 without the signed hash 420. Thus, the crypto module 230 may generate a hash of all preceding data elements and digitally sign the hash to generate the signature 450 or may separately sign the hash 430 to generate the signature 450. In still a further embodiment, the crypto module 230 may generate the secure packet 400 using the secured data 410, the signed hash 440, and the device signature 450 formed by the mobile device 310 signing the hash 430 without separately including the hash 430. In any case, the secure packet 400 includes the secured data 410 and signatures from both the vehicle 100 and the mobile device 310 in some form.

Accordingly, the communication module 230 then electronically communicates the secure packet 400 to the cloud-computing environment 300. The cloud-computing environment 300 may authenticate/verify a source of the packet 400 by, for example, decoding the signatures 440 and 450 using known public keys of the vehicle 100 and/or the mobile device 310 from, for example, the original registration (e.g., public key pair of the mobile key 260). The cloud-computing environment 300 (e.g., the privacy system 170 integrated therein), in one embodiment, removes the identifying signatures from the secure packet 400, generates an anonymized identifier (e.g., random alpha-numeric string), separately associates the anonymized identifier with the secured data 410 and the removed identifying signatures, and stores the secured data 410.

In further aspects, the cloud-computing environment 300 may perform additional processing of the telematics data 250 such as filtering the PII data from the telematics data 250. For example, upon receipt, the cloud decrypts the secured data 410 using the public key of the mobile device 310 and removes the PII data according to a defined heuristic (e.g., identifies known portions of the data 250 that may include PII data and removes or otherwise obfuscates the PII data). The filtered data may then be provided Subsequent access to the telematics data 250, in one approach, occurs via a request that is, for example, facilitated by a certified/registered vehicle. That is, in order for the user to access the telematics data 250 that the privacy system 170 of the mobile device 310 previously encrypted and sent to the cloud-computing environment 300, the mobile device 310 generates the request in cooperation with a current certified vehicle associated with the mobile device 310. That is, to access the telematics data 250 in the cloud, the mobile device 310 is to be presently connected with a certified/registered vehicle that can facilitate the access request.

Thus, for the mobile device 310 to acquire the telematics data 250 stored in the cloud-computing environment 300, the communication module 220 generates, in one embodiment, a request for the data using the original hash 430 of the data 410, which the communication module 220 communicates to the current vehicle (i.e., the vehicle 100 or another registered/certified vehicle) for signing. Upon subsequent receipt of the signed hash, the crypto module 230 may separately sign the hash 430 effectively reforming the digital signature 450. The communication module 220 can then generate the request using the signed hashes and communicate the request to the cloud-based system 300. In response, the communication module 220 receives the originally secured data 410, which may be signed by the cloud-computing environment 300 to ensure the authenticity of the communication. In this way, the privacy system 170 functions to improve the security for the telematics data 250 including PII data that is embedded therein, and to further improve access to the telematics data 250 for the user without regards to a particular vehicle in which the user/mobile device 310 are traveling.

Figure 5:
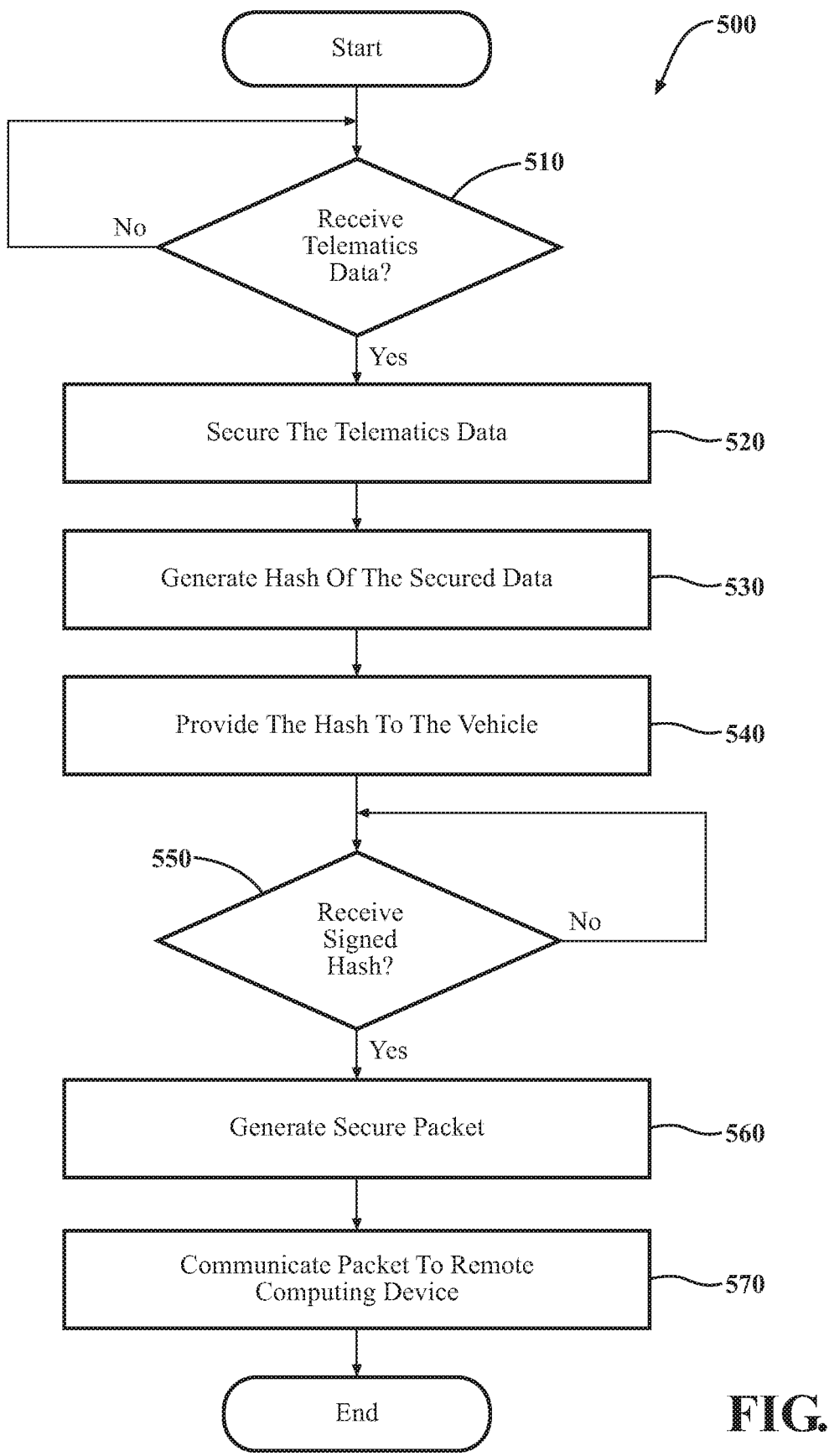
FIG. 5 is a flowchart illustrating one embodiment of a method associated with securing personally identifiable information associated with riding in a vehicle.

Additional aspects of improving the security of telematics data will be discussed in relation to FIG. 5. FIG. 5 illustrates a flowchart of a method 500 that is associated with securing personally identifiable information associated with riding in a vehicle. Method 500 will be discussed from the perspective of the privacy system 170 of FIGS. 1-3 and further from the perspective of the mobile device 310. While method 500 is discussed in combination with the privacy system 170, it should be appreciated that the method 500 is not limited to being implemented within the privacy system 170 but is instead one example of a system that may implement the method 500. Additionally, while the method 500 is illustrated as a generally serial process, various aspects of the method 500 can execute in parallel to perform the noted functions.

Figure 6:
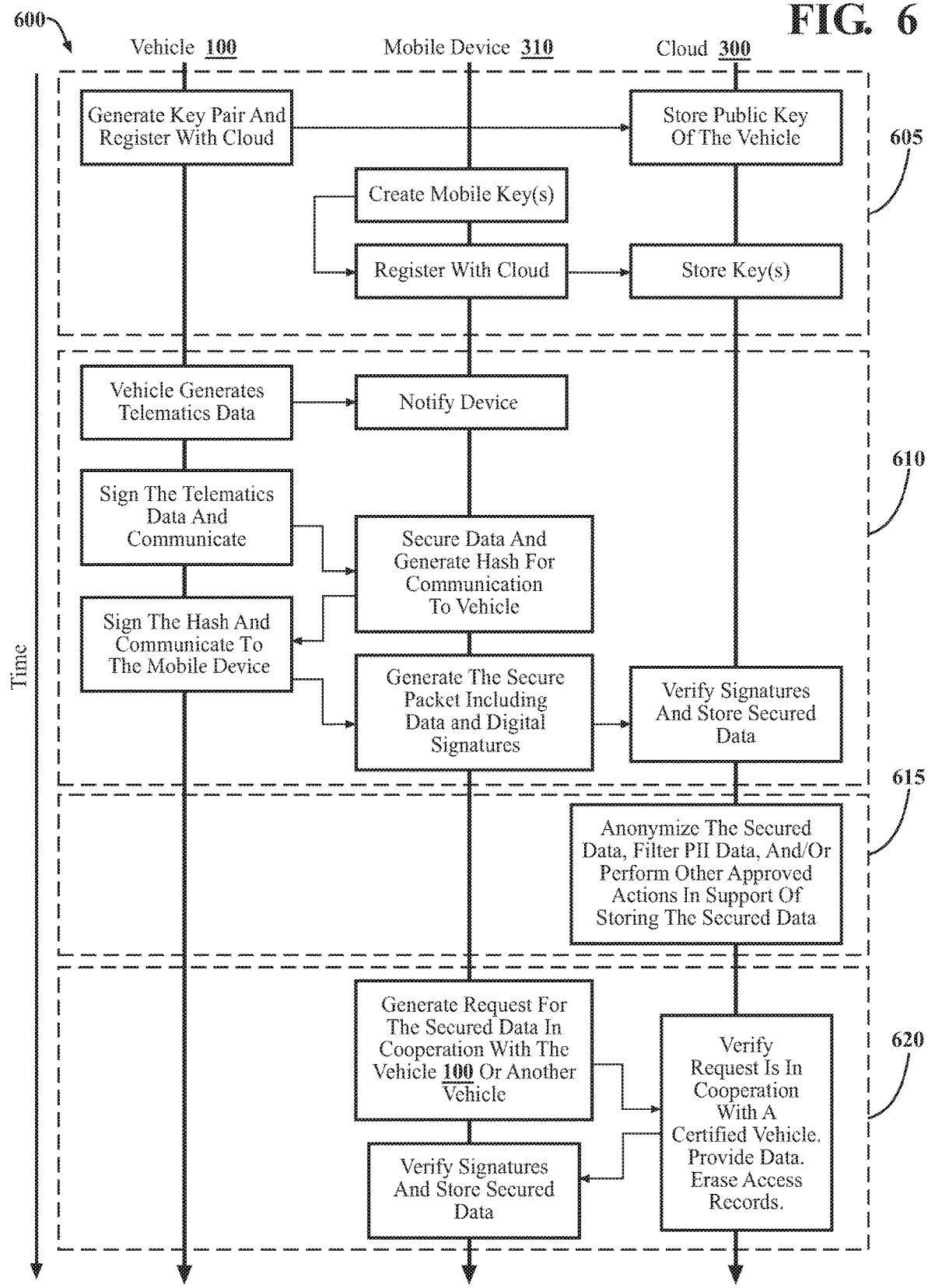
FIG. 6 is a diagram illustrating one embodiment of messages exchanged between various entities implementing the presently disclosed systems and methods.

Moreover, the discussion of the method 500 is provided in parallel with the discussion of FIG. 6. FIG. 6 illustrates exemplary communications and functions that the various entities may exchange/perform in support of the disclosed methods. It should be appreciated that the exemplary communication exchange 600 and identified functions are one example and are not an exhaustive illustration of various administrative and other communications that may be communicated between the systems in support of the various functions.

As an initial note to the discussion of the method 500, the method 500 is generally discussed under the assumption that the vehicle 100 and the mobile device 310 have previously registered with the cloud-computing environment 300 as discussed in relation to FIG. 2. Thus, the following discussion assumes that the mobile device 310 and the vehicle 100 have cryptographic key pairs registered with the cloud 300 and that the various devices include the privacy system 170 or subcomponent(s) thereof that facilitate the noted functionality. For example, as illustrated at registration block 605 of FIG. 6, both the vehicle 100 and the mobile device 310, at some point prior to securing the telematics data 250, register with the cloud 300. In one approach, registering with the cloud 300 includes generating cryptographic keys and communicating the keys to the cloud, or at least a public key of an asymmetric key pair in order to register an identity with the cloud 300. In one or more approaches, the process of registering the vehicle 100 is administered via an OEM on behalf of the vehicle 100 and as a trusted source.

By contrast, the mobile device 310 is separately registered by electronic inputs associated with the user/rider that cause the device 310 to, for example, download a mobile application, install the mobile application, accept a password/seed value, and generate the mobile key 260 (private key) and a public key therefrom. The communication module 220 of the mobile device 310 then provides at least the public key to the cloud 300 in order to register the mobile device 310. It should be appreciated that the cloud 300 may maintain a registration table or other electronic data structure to track the mobile device 310, the vehicle 100, and other entities along with associated keys, and/or other identifying information.

At 510, the communication module 220 monitors for a communication from the vehicle 100. In one embodiment, the communication module 220 receives an indicator from the vehicle 100 prior to receiving the telematics data 250. In further implementations, the communication module 220 simply receives the telematics data 250 itself. As illustrated in FIG. 6 at block 610, an initial indicator is shown followed by the telematics data 250 itself in a subsequent communication. However, it should be appreciated that the initial indicator may be skipped in various implementations. Separately, the communication module 220 initially establishes a connection with the vehicle 100 to, for example, indicate a presence of the mobile device 310 and initiate the process of securing the telematics data 250. Thus, in one or more approaches, the initial indicator from the vehicle 100 may serve as a one-time inducing event for establishing a session after which the communication module 220 receives the telematics data 250 at intervals as previously discussed. In any case, the communication module 220 waits for the telematics data 250 from the vehicle 100, and upon receipt continues with securing the telematics data as discussed at block 520.

At 520, the crypto module 230 secures the telematics data 250 according to at least the mobile cryptographic key 260. In one embodiment, the crypto module 230 encrypts the telematics data 250 to generate secured data using the cryptographic key 260 according to an encryption algorithm. The encryption algorithm may take different forms depending on the particular implementation but may generally include elliptic curve cryptography (ECC), a Rivest Shamier Adleman (RSA) cryptography algorithm, or another suitable cryptographic algorithm for use with asymmetric key pairs. The crypto module 230 generally functions to use cryptography to obfuscate (i.e., conceal) the underlying telematics data 250 so that the telematics data 250 secured against intrusion by unauthorized parties. As shown in block 610 of FIG. 6, the crypto module 230 encrypts the telematics data 250 and may also generate further securing data elements as discussed at 530.

At 530, the crypto module 230 generates a cryptographic hash of the secured data from block 520. In one embodiment, the hash functions as a message authentication code to uniquely identify the secured data. Thus, the crypto module 230 may generate the hash and electronically sign the hash with the mobile key 260 to identify and authenticate the secured data as originating from the mobile device 310. Separately, the crypto module 230 may retain/store a copy of the hash without an explicit signature for use by the vehicle 100 and/or to include with a secure packet along with the secured data. As previously mentioned, the crypto module 230 may implement various hash algorithms to perform the hash such as a SHA hash algorithm (e.g., SHA-2, SHA-3, etc.), an AES block cipher, a message digest algorithm (e.g., MD4, MD5, etc.), or another suitable hash algorithm. In further aspects, in addition to generating the hash 430 of the secured data, the crypto module 230 of the mobile device 310 generates a separate unique identifier for anonymously tracking the secured data. That is, the crypto module 230 generates an alphanumeric identifier and provides the identifier along with the secure packet to the cloud 300 so that the cloud 300 can index the secured data using the identifier without any particular correlation to the vehicle 100 or the mobile device 310. As discussed in further detail subsequently, the cloud 300 may generate the unique identifier instead of the mobile device 310 and may communicate the unique identifier back to the mobile device 310 for storage and subsequent reference.

At 540, the communication module 220 communicates the plain hash to the vehicle 100. In one embodiment, the communication module 220 provides the plain hash of the secured data to the vehicle 100 for the vehicle 100 to maintain a record of the secured data and so that both the vehicle 100 and the mobile device 310 digitally sign the same hash value. The vehicle 100 uses the private key of the key pair registered with the cloud 300 so that the cloud 300 can identify the vehicle 100 in relation to the secured data.

At 550, the communication module 220 waits to receive a signed hash from the vehicle 100. In one embodiment, the communication module 220 monitors for or otherwise waits to receive the signed hash, and upon receiving the signed hash indicates the reception to the crypto module 230. The signed hash received at 550 is the hash provided at 540 that the vehicle 100 signs using the private key of the vehicle 100.

At 560, the crypto module 230 generates the secure packet. In one embodiment, the crypto module 230 generates the secure packet by assembling at least the secured data, the signed hash of the mobile device 310, and the signed hash of the vehicle 100 into a packet for communication to the cloud 300. In this way, the crypto module 230 includes the actual secured data and the signed hashes as identifiers of the associated entities (i.e., the device 310 and the vehicle 100). Of course, as discussed in additional detail with reference to FIG. 4 previously, the secure packet may include additional or fewer elements (e.g., the plain hash).

At 570, the communication module 220 electronically communicates the secure packet to the cloud 300. In one embodiment, the communication module 220 communicates to the cloud 300 via an established wireless connection. In alternative arrangements, the communication module 220 may temporarily store the secure packet for transmission to the cloud 300 when a preferred connection is available. A preferred connection may be a wifi connection or other connection having higher bandwidth or lower data rates than, for example, a cellular-based connection of the mobile device 310. In either case, the communication module 220 provides the secure packet to the cloud 300 to cause the cloud 300 to securely store the secured data without identifying a user associated with the mobile device.

As shown in FIG. 6, the process of communicating and securing the telematics data 250 generally includes four distinct blocks of functions/communications. The block 605 corresponds with the registration of the various devices, and the block 610 corresponds with the general operating conditions, including securing and providing the data to the cloud 300. Blocks 615 and 620 generally correlate with data management and retrieval of the telematics data 250 at the cloud 300.

Figure 7:
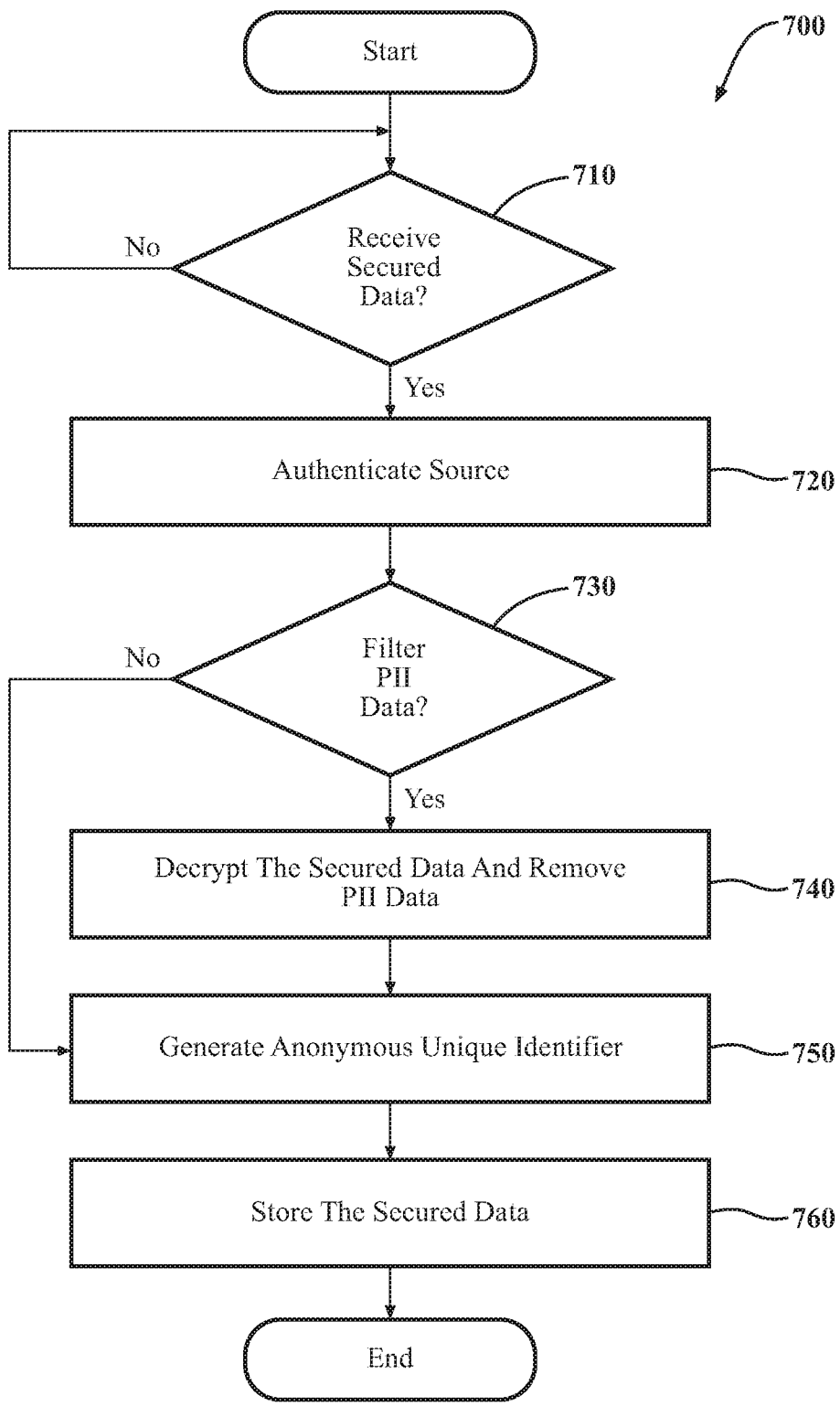
FIG. 7 is a flowchart illustrating one embodiment of a method associated with securely storing telematics data.

Therefore, as further explanation of additional processes of the privacy system 170 embedded with the cloud-computing environment 300, consider FIG. 7. FIG. 7 illustrates a flowchart of a method 700 that is associated with securing and storing telematics data. Method 700 will be discussed from the perspective of the cloud-computing environment 300 (also referred to herein as the cloud 300) of FIG. 3. While method 700 is discussed in combination with the cloud 300, it should be appreciated that the method 700 is not limited to being implemented within the cloud 300 as shown but is instead one example of an implementation that may perform the method 700. Additionally, while the method 700 is illustrated as a generally serial process, various aspects of the method 700 can execute in parallel to perform the noted functions.

At 710, the privacy system 170 of the cloud 300 monitors for and waits on the reception of secure packets from the mobile device 310 and/or other similar devices. In one embodiment, the privacy system 170 may expect the secure packets at regular intervals upon the initiation of a trip by a user. In alternative arrangements, the packets may arrive at irregular intervals according to a defined payload capacity. In either case, the packets generally conform to known protocols for the secure transmission of data over communication networks.

At 720, the privacy system 170 of the cloud 300 authenticates a source of the secure packet. That is, in one embodiment, the privacy system 170 of the cloud 300 independently generates a hash of the secured data in the secure packet. The privacy system 170 of the cloud 300 may then further decrypt the signed hashes in the secure packet from both the vehicle 100 and the mobile device 310 and compare the independently generated hash with the decrypted hashes to authenticate the secured data. Moreover, the cloud 300 uses the public keys of the respective entities to decrypt the hashes and further to ensure that the entities are registered/certified to handle the telematics data 250. Thus, the cloud 300 generally uses the previously mentioned lookup table to identify the sources and the keys of the sources.

At 730, the privacy system 170 of the cloud 300 determines whether the personally identifiable information (PII) is to be filtered/removed from the secured data. In one embodiment, the user of the mobile device 310, as part of registering or as subsequently identified, authorizes the removal of the PII data. The user may provide the authorization so that the PII data can be used by third parties to provide additional features such as, for example, various analytics, roadside assistance, etc. The cloud 300 generally stores an indicator of the authorization along with the registration information for the entity in the table or otherwise. In a further aspect, the mobile device 310 may independently affirm on a per-ride basis via an identifying flag that is provided in the secure packet.

At 740, the privacy system 170 of the cloud 300 decrypts the secured data and removes or otherwise filters the PII data. As previously described, the system 170 of the cloud 300 decrypts the secured data using the public key of the mobile device 310. The public key of the mobile device 310 is public only in the sense that the key is available to the cloud 300 in addition to the mobile device 310 and is not otherwise available to any entity. Instead, the cloud 300 retains the public key of the mobile device 310 in a confidential and secure manner so as to protect the secured data and the PII data included therein. As such, when the cloud 300 decrypts the secured data to provide the telematics data 250 in an original form, the telematics data 250 still includes the sensitive PII data.

Thus, the cloud 300 filters the telematics data 250 to identify aspects that are potentially classified as PII data and to remove or otherwise obscure the PII data so that the data no longer identifies the user. That is, the cloud 300 may introduce noise into GPS data to obscure start and endpoints, remove phone call logs, and otherwise alter the telematics data 250 in order to anonymize the data and links to the user. The cloud 300 can then provide the filtered telematics data to approved entities or store the filtered data without the PII data. In one aspect, the cloud 300 may re-encrypt the filtered telematics data and store the data in a similar manner as the secured data.

At 750, the system 170 of the cloud 300 removes identifying information from the secured data and generates a unique anonymous identifier of the secured data. That is, in one embodiment, the cloud 300 removes the digital signatures from the secured data as included in the secure packet. The cloud 300 then generates a random number, a plain hash, or another unique identifier of the secure data and indexes the secure data according to the identifier. In one approach, the cloud further associates the identifier with the mobile device 310 and the vehicle 100 for subsequent reference. Alternatively, the cloud 300 communicates the unique identifier back to the mobile device 100 and forgets the association in order to anonymously store the secured data. That is, the cloud 300 stores the secured data, in one approach, without knowing to which device and/or vehicle the secured data is associated. In this way, the cloud 300 can store the secured data in a truly anonymous manner.

At 760, the system 170 of the cloud 300 stores the secured data using the identifier as a unique indexing value for subsequent retrieval. In this way, the cloud 300 anonymously and securely stores the telematics data 250 so that the PII data is stored to retain the privacy of the user and while providing for subsequent retrieval by the user independent of a particular vehicle and by authorized third parties as specified by the user. The cloud 300 may further specify an expiration date of the secured data, an original date of storage, and other metadata about the collection, communication, and storage of the telematics data. In one aspect, the cloud 300 automatically deletes the secured data upon lapsing of the expiration date in order to avoid storing stale data that is no longer relevant or needed.

Once stored, as previously detailed, the mobile device 310 may retrieve the secured data using, for example, a request that includes digitally signed versions of the original hash of the data from both the mobile device 310 and a certified vehicle. The certified vehicle may be the original vehicle 100 or another vehicle that is registered with the cloud 300. The certified vehicle functions as an additional point of security to further authenticate the mobile device 310 and protect against malicious attackers. In any case, the disclosed systems and methods described herein generally function to improve the privacy of users/riders through the adaptable use of mobile devices to help secure telematics data that includes PII data.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the privacy system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the privacy system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the privacy system 170, and/or the autonomous driving module(s) 160 may control some or all of these vehicle systems 140 and, thus, may be partially or fully autonomous.

The processor(s) 110, the privacy system 170, and/or the autonomous driving module(s) 160 can be operatively connected to communicate with the various vehicle systems 140 and/or individual components thereof. For example, returning to FIG. 1, the processor(s) 110, the privacy system 170, and/or the autonomous driving module(s) 160 can be in communication to send and/or receive information from the various vehicle systems 140 to control the movement, speed, maneuvering, heading, direction, etc. of the vehicle 100. The processor(s) 110, the privacy system 170, and/or the autonomous driving module(s) 160 may control some or all of these vehicle systems 140.

The processor(s) 110, the privacy system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the privacy system 170, and/or the autonomous driving module(s) 160 can control the direction and/or speed of the vehicle 100. The processor(s) 110, the privacy system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the privacy system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A privacy system for securing personally identifiable information (PII) associated with riding in a vehicle, comprising:
   one or more processors;
   a memory communicably coupled to the one or more processors and storing:
   a crypto module including instructions that when executed by the one or more processors cause the one or more processors to, in response to receiving telematics data about a current trip of the vehicle the telematics data including a signed hash of the telematics data generated by the vehicle using a vehicle cryptographic key, secure the telematics data according to at least a mobile cryptographic key associated with a mobile device to provide the telematics data as secured data that is obfuscated, the telematics data including the PII associated with the user of the mobile device, the PII including at least a starting point and an end point for a route of the vehicle and the telematics data being about a current trip that is one of a rideshare trip and an e-hailing ride within the vehicle that is a commercial vehicle,
   wherein the crypto module includes instructions to generate, by the mobile device, a secure packet including at least the secured data and a signature from the vehicle associated with the secured data; and
   a communication module including instructions that when executed by the one or more processors cause the one or more processors to communicate the secure packet to a remote computing device from the mobile device to cause the remote computing device to securely store the secured data without identifying the user and cause the remote computing device to remove identifying information from the secured data.

2. The privacy system of claim 1, wherein the crypto module includes instructions to secure the telematics data including instructions to encrypt the telematics data using the mobile cryptographic key of the mobile device, and generating a cryptographic hash of the telematics data.

3. The privacy system of claim 1, wherein the crypto module includes instructions to generate the secure packet including instructions to:
   generate a cryptographic hash of at least the secured data, and
   append a signed hash of the cryptographic hash from the vehicle to the secured data to generate the secure packet.

4. The privacy system of claim 1, wherein the communication module includes instructions to register, by the mobile device, with the remote computing device by providing at least the mobile cryptographic key to the remote computing device to store the mobile cryptographic key with the remote computing device for the remote computing device to selectively access the telematics data without identifying a source of the telematics data.

5. The privacy system of claim 1, wherein the communication module includes instructions to retrieve, from the remote computing device, the secured data using a date and a cryptographic hash of the secured data as an identifier to induce the remote computing device to provide the secured data, and
   wherein the communication module includes instructions to retrieve the secured data via an additional authenticating source that is a different vehicle.

6. The privacy system of claim 1, wherein the communication module includes instructions to communicate the secure packet to cause the remote computing device to securely store the secured data including instructions to anonymously store the secured data for subsequent retrieval by the mobile device, and wherein the identifiers include a cryptographic hash from the vehicle.

7. The privacy system of claim 1, wherein the privacy system is integrated with the mobile device that is a smartphone.

8. The privacy system of claim 1, wherein the communication module includes instructions to communicate the secure packet including instructions to operate as a secure gateway between the vehicle and the remote computing device, and wherein the remote computing device is a cloud-based computing resource.

9. A non-transitory computer-readable medium for securing personally identifiable information (PII) associated with riding in a vehicle and including instructions that when executed by one or more processors cause the one or more processors to:
   in response to receiving telematics data about a current trip of the vehicle the telematics data including a signed hash of the telematics data generated by the vehicle using a vehicle cryptographic key, secure, by a mobile device, the telematics data according to at least a mobile cryptographic key associated with the mobile device to provide the telematics data as secured data that is obfuscated, the telematics data including the PII associated with a user of the mobile device, the PII including at least a starting point and an end point for a route of the vehicle and the telematics data being about a current trip that is one of a rideshare trip and an e-haling ride within the vehicle that is a commercial vehicle;
   generate, by the mobile device, a secure packet including at least the secured data and a signature from the vehicle associated with the secured data; and
   communicate the secure packet to a remote computing device from the mobile device to cause the remote computing device to securely store the secured data without identifying the user and cause the remote computing device to remove identifying information from the secured data;
   communicating, by the mobile device, the secure packet to a remote computing device to cause the remote computing device to securely store the secured data without identifying the user and causing the remote computing device to remove identifying information from the secured data.

10. The non-transitory computer-readable medium of claim 9, wherein the instructions to secure the telematics data include instructions to encrypt the telematics data using the mobile cryptographic key of the mobile device, and generating a cryptographic hash of the telematics data.

11. The non-transitory computer-readable medium of claim 9, wherein the instructions to generate the secure packet include instructions to:
   generate a cryptographic hash of at least the secured data, and
   append a signed hash of the cryptographic hash from the vehicle to the secured data to generate the secure packet, and
   wherein the instructions include instructions to retrieve the secured data via an additional authenticating source that is a different vehicle.

12. A method of securing personally identifiable information (PII) associated with riding in a vehicle, comprising:
   in response to receiving, in a mobile device from the vehicle, telematics data about a current trip of the vehicle the telematics data including a signed hash of the telematics data generated by the vehicle using a vehicle cryptographic key, securing the telematics data according to at least a mobile cryptographic key associated with the mobile device to provide the telematics data as secured data that is obfuscated, the telematics data including the PII associated with a user of the mobile device, the PII including at least a starting point and an end point for a route of the vehicle and the telematics data being about a current trip that is one of a rideshare trip and an e-haling ride within the vehicle that is a commercial vehicle;
   generating, by the mobile device, a secure packet including at least the secured data and a signature from the vehicle associated with the secured data; and
   communicating, by the mobile device, the secure packet to a remote computing device to cause the remote computing device to securely store the secured data without identifying the user and causing the remote computing device to remove identifying information from the secured data.

13. The method of claim 12, wherein securing the telematics data includes encrypting the telematics data using the mobile cryptographic key of the mobile device, and generating a cryptographic hash of the telematics data.

14. The method of claim 12, wherein generating the secure packet includes:
   generating a cryptographic hash of at least the secured data,
   communicating the cryptographic hash to the vehicle,
   receiving a signed hash from the vehicle of the cryptographic hash, and
   appending the signed hash to the secured data to generate the secure packet.

15. The method of claim 12, further comprising:
   registering, by the mobile device, with the remote computing device by providing at least the mobile cryptographic key to the remote computing device to store the mobile cryptographic key with the remote computing device for the remote computing device to selectively access the telematics data without identifying a source of the telematics data.

16. The method of claim 12, further comprising:
   retrieving, by the mobile device from the remote computing device, the secured data using a date and a cryptographic hash of the secured data as an identifier to induce the remote computing device to provide the secured data.

17. The method of claim 12, wherein communicating the secure packet to cause the remote computing device to securely store the secured data includes anonymously store the secured data for subsequent retrieval by the mobile device,
   wherein the identifying information includes a cryptographic hash from the vehicle, and
   wherein retrieving the secured data includes retriving the secured data via an additional authenticating source that is a different vehicle.

* * * * *

UNITED STATES PATENT AND TRADEMARK OFFICE
CERTIFICATE OF CORRECTION

| | |
|---|---|
| PATENT NO. | : 11,314,893 B2 |
| APPLICATION NO. | : 16/552377 |
| DATED | : April 26, 2022 |
| INVENTOR(S) | : Vladimeros Vladimerou |

It is certified that error appears in the above-identified patent and that said Letters Patent is hereby corrected as shown below:

In the Claims

In Claim 1, replace "associated with the user of the mobile device" with -- associated with a user of the mobile device --.

In Claim 17, replace "data includes retriving the" with -- data includes retrieving the --.

Signed and Sealed this
Eleventh Day of July, 2023

Katherine Kelly Vidal
*Director of the United States Patent and Trademark Office*